Feb. 6, 1951 G. E. STILWELL ET AL 2,540,766
ROTARY BOX DUMP
Filed July 21, 1947 2 Sheets-Sheet 1
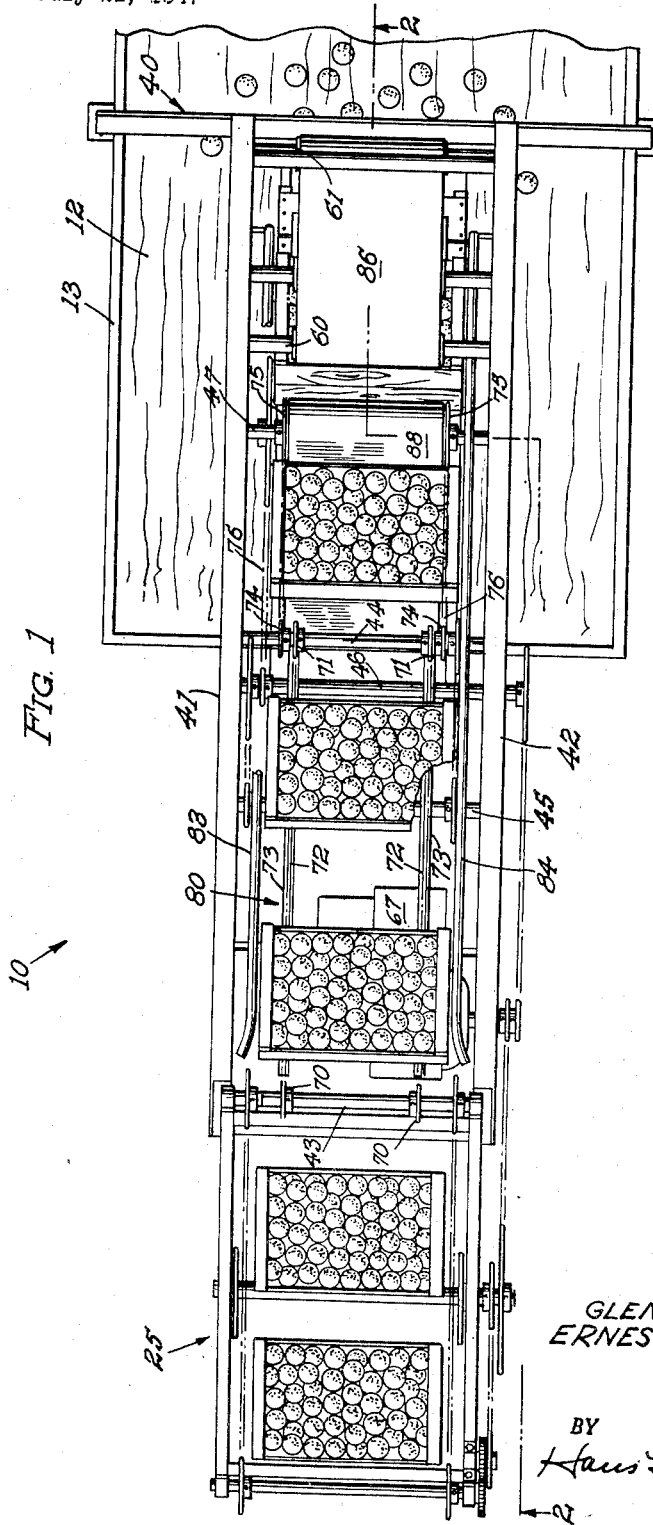
GLENN E. STILWELL
ERNEST A. VERRINDER
INVENTORS
BY Hans G. Hoffmeister.
ATTORNEY

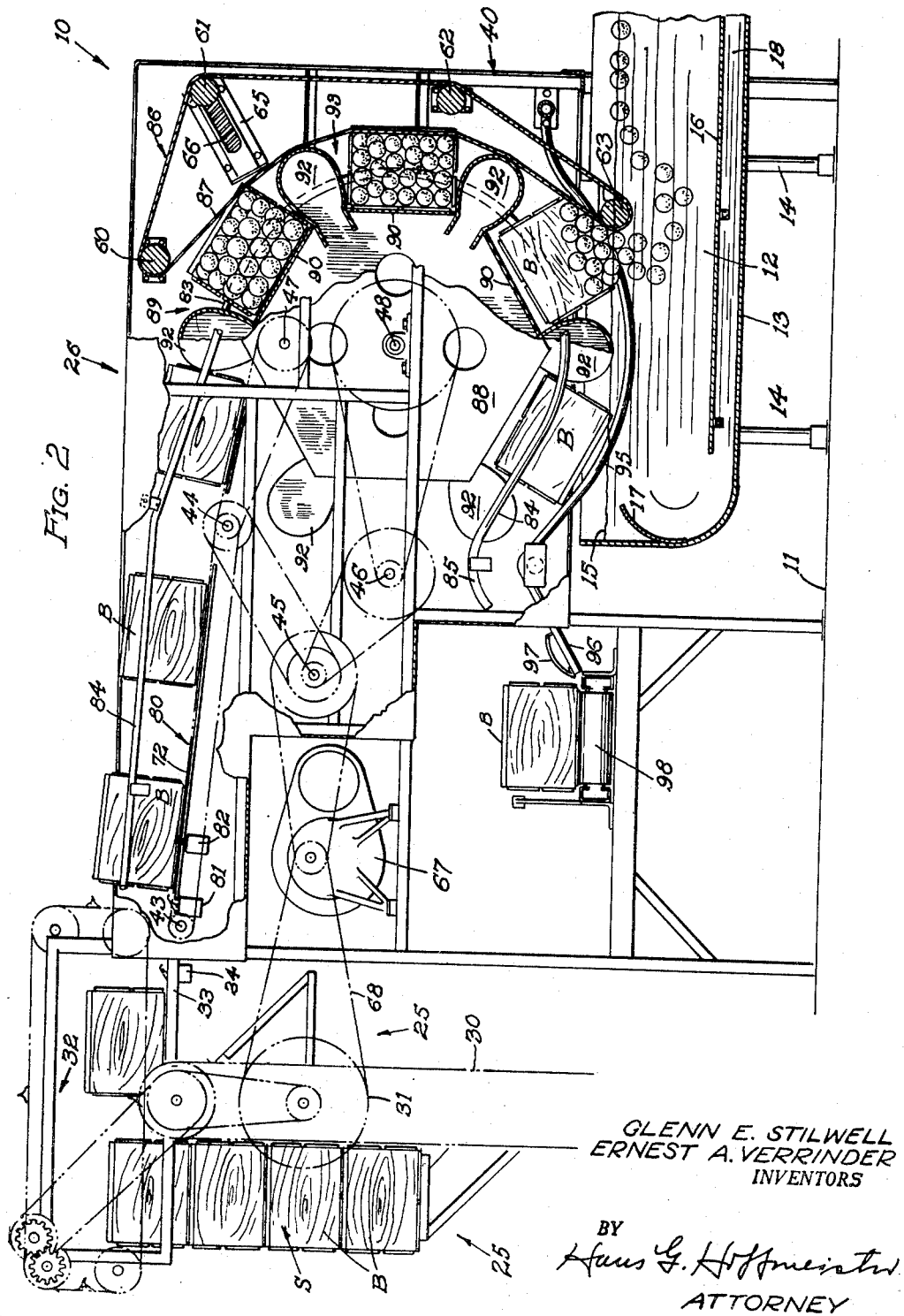

Patented Feb. 6, 1951

2,540,766

UNITED STATES PATENT OFFICE 2,540,766

ROTARY BOX DUMP

Glenn E. Stilwell and Ernest A. Verrinder, Riverside, Calif., assignors to Food Machinery and Chemical Corporation, a corporation of Delaware Application July 21, 1947, Serial No. 762,388

6 Claims. (Cl. 214—1.1)

This invention relates to the dumping of the loose contents from containers and is particularly useful in dumping fruit from field boxes in packing houses.

The fruit is ordinarily brought to the packing house from the orchards and groves in these field boxes from which it must be dumped as the first step in preparing it for shipment. It is of vital importance that there being as little bruising or scratching of the fruit as possible as any such damage increases the natural tendency of the fruit to spoil before it reaches the market. Difficulty has been experienced in eliminating rough handling of the fruit incidental to its being thus dumped.

It is an object of this invention to provide a box dumper which handles the fruit very gently in removing it from the boxes and thus producing a minimum of damage to the fruit in this operation.

Because of the particular susceptibility of lemons to damage in handling, it has been the practice for many years, when dumping lemons from field boxes, to submerge each box of lemons in a tank of water and invert the box only after it is thus submerged. The buoyancy given the lemons by water thus entering the box before the lemons leave the same, greatly reduces the friction of the lemons against each other and against the box as they leave the box. This is called "wet-dumping" and has always been a hand operation.

It is another object of the invention to provide a box dumper which will automatically dump fruit from boxes and which is substantially equivalent to the hand-performed wet-dumping method in the gentleness with which it removes the fruit from the boxes.

In many packing houses, when the fruit is brought in from the field in field boxes, the filled boxes are stacked for storage on the same floor on which the processing of the fruit is done and where it is therefore desired, when the time comes to process this fruit, to dump it from the boxes into a tank of wash water.

It is a still further object of this invention to provide a stack dumper to which stacks of field boxes filled with fruit may be fed and which will break down these stacks and dump the fruit successively from the boxes thereof directly into a tank of wash water supported at the normal operating level on the same floor as that on which the stacks were stored.

The manner of accomplishing the foregoing objects as well as further objects and advantages will be made manifest in the following description taken in connection with the accompanying drawings in which:

Fig. 1 is a plan view of a preferred embodiment of the invention.

Fig. 2 is a diagrammatic vertical sectional view taken on the line 2—2 of Fig. 1.

Referring specifically to the drawings, the invention is therein illustrated as embodied in a rotary stack box dump 10 which is mounted on a floor 11 and is particularly designed for picking up whole stacks of filled boxes fed thereto from this floor, unstacking said boxes and dumping the contents of each of these directly into a body of water 12 contained in a wash tank 13 supported by short legs 14 on the floor 11.

The tank 13 is preferably almost filled with water 12 so that the surface 15 of this water is close to the top of the tank.

The tank 13 has a false bottom 16, and a deflector 17 and a circulating pump (not shown) which constantly withdraws water from the end of the tank 13 which is not shown in Fig. 2 and discharges this into the passage 18 formed between the bottom of the tank 13 and the false bottom thereof so as to set up a circulation of water in the tank as shown by the arrows superimposed on the sectional view of this tank in Fig. 2.

Inasmuch as the tank 13 and the water 12 constitute means for receiving fruit dumped from the boxes by the dumper 10, said tank and water may be considered as a part of said dumper.

The dumper 10 also includes an unstacker 25 and a box inverter 26 which are both mounted on the floor 11. The unstacker 25 may be of any of the reliable unstackers available on the market and the unstacker shown in the drawings is a diagrammatic representation of that disclosed in U. S. Letters Patent to Marsden and Stebler, No. 2,258,461, issued October 7, 1941.

This unstacker includes an elevator 30 for elevating stacks S of boxes B, this being driven by a sprocket 31. The unstacker 25 also includes a device 32 which removes the boxes B successively from the top of the stack S and delivers these horizontally from the unstacker along a conveyor 33.

This conveyor is provided with a limit switch 34, the purpose of which will be made clear hereinafter.

The box inverter 26 has a structural steel frame 40 which includes a pair of spaced side frames 41 and 42. Suitable bearings (not shown) are provided on these side frames, and journalled in these bearings are shafts 43, 44, 45, 46, 47 and 48 and the trunnions of pulley rollers 60, 61, 62 and 63.

The bearings in which trunnions of the roller 61 journal are slideable in boxes 65 and are pressed outwardly by expansion springs 66 trapped in said boxes for a purpose to be made clear later.

Also supported on the frame 40 is a geared electric motor 67. This motor drives the unstacker 25 through a chain 68 and also rotates shafts 45, 44, 46 and 48 by chain and sprocket connections therewith as clearly shown diagrammatically in Fig. 2.

Small sprockets 70 are fixed on the shaft 43 (see Fig. 1) and similar sprockets 71 are fixed on the shaft 44, these sprockets being connected by endless box conveying chains 72, the upper runs of which are supported by tracks 73 provided on the frame 40.

The shaft 44 has an outer pair of sprockets 74 which are aligned with sprockets 75 on shaft 48 and connected therewith by endless chains 76.

The chains 72 and 76 comprise a box conveyor 80, at the entrance end of which are provided a pair of spaced limit switches 81 and 82. Mounted on the side frames 41 and 42 are guard rails 83 and 84 which extend alongside and above the conveyor 80, then follow a path concentric with the shaft 48, and, at their lower ends, straighten and terminate in reverse turns 85.

As shown in Fig. 1, boxes B are adapted to be disposed lengthwise between and guided by the rails 83 and 84 as said boxes travel on the conveyor 80.

The shafts 47 are stub shafts so that there is a central rotor space between the sprockets 75.

Trained about the rollers 60, 61, 62 and 63 is an endless cover belt 86, the inner arcuate run 87 of said belt extending directly from the roller 60 to the roller 63 and is held approximately in an arc concentric to the shaft 48 in a manner and for a purpose to be made clear hereinafter.

Mounted on the shaft 48 is the box inverter rotor 88, the periphery of which is provided with a series of box receiving pockets 89, these having bottoms 90 and being separated by radial separating walls 92.

The pockets 89 are adapted to receive filled boxes B as shown in Fig. 2 and operate to govern downward movement of said boxes with the latter covered by the arcuate belt run 87, this rotor cooperating with said belt to form an arcuate box inversion pathway 93. The box enters this path at its upper end before the box has been tilted from its upright position beyond the angle of repose of the fruit in the box.

In the event a box is not fed to one of the pockets 89 the adjacent walls 92 hold the belt run 87 radially outwardly away from the rotor so that the belt 86 is kept taut on the rollers about which it is trained.

It is to be noted that the belt run 87 embraces substantially less than half of the rotor 88. The upper end of the pathway 93 lies just beneath the roller 60 and the lower end of this pathway lies just above the roller 63, the latter preferably being wholly or partially submerged in the water 12.

Boxes B moving downwardly along the inversion pathway 93 become inverted by virtue of the curved character of this pathway so that each box leaves the lower end of the latter practically inverted. As the box thus moves out of covered relation with the belt run 87, the fruit gravitates downwardly therefrom.

Disposed alongside the belt 86, as the latter approaches the roller 63, are a pair of guide pipes 95 which are rigidly supported on the frame 40 and are substantially concentric with the shaft 48. End portions 96 of these pipes are bent sharply downwardly to terminate with a box rolling stop 97 which rotates each box into an upright position when this stop is engaged by this box, the latter then falling on a conveyor 98, mounted on the frame 40, and which carries away the empty boxes.

Operation

The general mode of operation is believed already apparent in the above description. It is to be noted that both the unstacker 25 and box inverter 26 are driven through chains by the same motor 67 so that these elements of the box dumper 10 always function in the same timed relation.

The limit switches 81, 82 and 34 are hooked up in the electrical circuit of the motor 67 so as to stop this when all of the switches are simultaneously depressed. The only time this can occur is when two boxes are jammed against each other on the conveyor 33 and the receiving end of the conveyor 80. As this never happens during normal operation of the machine, the stopping of the motor 67 under such circumstances is necessary to restore the machine to its normal operating condition.

By virtue of the uniform timed relation of the unstacker 25 and the box inverter 26, boxes are fed to the latter along the conveyor 80 so that one of these boxes enters each of the pockets 89, its downward movement through the box inverting pathway 93 being then properly controlled by the rotor 88 with the resultant gentle dumping of the contents of each box into the water 12 as this box moves out of covered relation with the belt 86. The empty boxes are thence guided by the pipes 95 and propelled by the rotor walls 92 onto the conveyor 98.

From the foregoing it may be seen that this invention provides an improved means for receiving stacks of filled boxes of fruit or any other loose commodity, disassembling these stacks into individual boxes, and then inverting these boxes successively under circumstances which protect the product being handled from abrasion or scratching incidental to the dumping operation.

If a more complete submersion of each box is desired prior to the release of the product therefrom, the sides of the tank 13 may extend further upward and the level of the tank may be correspondingly raised so that a substantial portion of the contents of each box being dumped will receive buoyancy from submersion in the water 12 prior to the box extending downwardly from covered relation with the belt run 87.

While only a single embodiment of the invention has been disclosed herein, it is to be understood that various changes and modifications may be made in this without departing from the spirit of the invention or the scope of the appended claims.

The claims are:

1. In a box dumper, the combination of: a rotor having a series of pockets formed in the periphery thereof for receiving boxes; means for feeding boxes to said pockets when they are disposed upwardly; cover means presenting a concave face to said rotor and disposed so as to cover the open upper ends of boxes resting in said pockets as the latter descends with the rotation of said rotor, said covering means terminating at a suitable point where said box has become inverted by its rotation with said rotor; guide means for guiding said boxes to maintain them in their respective pockets after said boxes move away from covered relation with said cover means so that the contents of said inverted boxes gravitate therefrom; and means for receiving the contents thus dumped from said boxes.

2. A combination as in claim 1 in which said cover means comprises an endless belt and means for mounting said belt to permit the portion thereof covering said boxes to move with said boxes as the latter rotate with said rotor.

3. A combination as in claim 2 in which successive box receiving pockets on said rotor are divided by radial members which maintain the concavity of said cover belt when one of said pockets is empty due to failure to feed a box thereto.

4. In a box dumper, the combination of: means forming an arcuate box inversion pathway including an inner member formed symmetrically about the center of said path and an outer member comprising a flexible endless belt, the latter being adapted to cover open upper ends of boxes fed to the upper end of said path and to maintain said boxes covered while the latter travel downwardly between said members along said path until said boxes are discharged from the lower end of said path and move away from covered relation with said belt; arcuate guides for said boxes disposed laterally from said belt and engaging the ends of said boxes to substantially retain the latter in uniform radial relation with said inner path forming member until the dumping of the contents from each of said boxes is completed, said dumping being effected by said box passing out of covered relation with said outer member while said box is inverted; and means for receiving said contents as they are dumped from said boxes.

5. In a box dumper, the combination of: means forming an arcuate box inversion pathway including a central member about which the box travels when traversing said pathway and an outer concave member within the concavity of which said box travels when traversing said path, said outer member covering open tops of said boxes while the latter travel downwardly between said members until said boxes are discharged from the lower end of said pathway and move away from covered relation with said outer member while inverted; guides for supporting said boxes by engaging the ends thereof, as said boxes move away from the lower end of said outer member, to permit the contents of said box to gravitate therefrom leaving said box empty; and power means utilizing one of said members for propelling said boxes along said pathway.

6. A combination as in claim 5 in which said inner member is a rotor having circumferentially spaced radial elements which separate adjacent boxes traveling along said pathway, said power means being applied to said rotor whereby said elements propel said boxes along said pathway and over said guides and eject the empty boxes from said dumper.

GLENN E. STILWELL.
ERNEST A. VERRINDER.

REFERENCES CITED

The following references are of record in the file of this patent:

UNITED STATES PATENTS

| Number | Name | Date |
| --- | --- | --- |
| 1,127,113 | Thiemann | Feb. 2, 1915 |
| 1,907,458 | Stevenson | May 9, 1933 |
| 1,917,709 | Griffith et al. | July 11, 1933 |
| 1,945,758 | Turner | Feb. 6, 1934 |
| 2,018,748 | Thompson | Oct. 29, 1935 |
| 2,032,946 | McHenry | Mar. 3, 1936 |
| 2,397,129 | Davis | Mar. 26, 1946 |